UNITED STATES PATENT OFFICE.

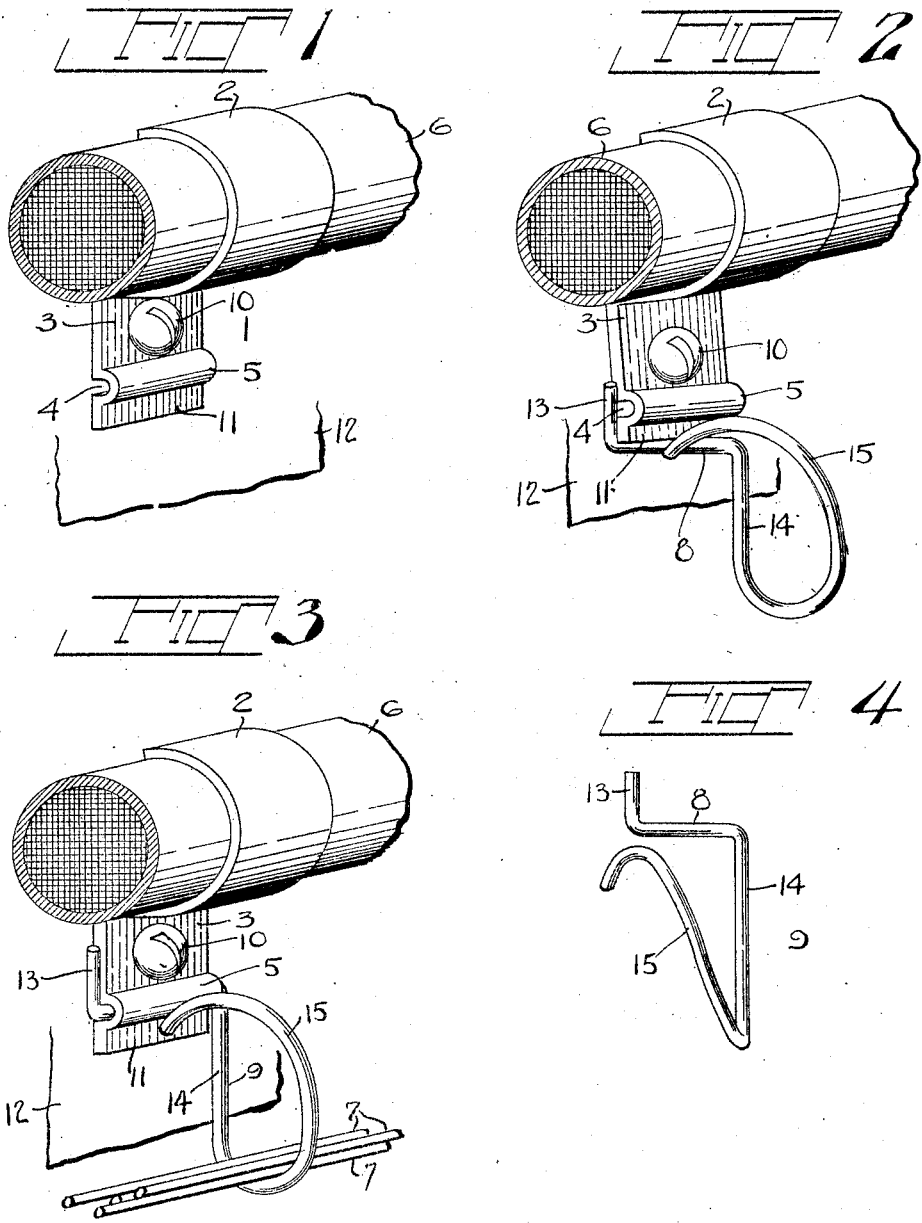

WILLIAM J. HISS, OF NEW YORK, N. Y., ASSIGNOR TO DIAMOND EXPANSION BOLT COMPANY, OF NEW YORK, N. Y., A CORPORATION OF NEW YORK.

CONDUIT OR CABLE CLAMP AND BRIDLE-RING.

1,365,615. Specification of Letters Patent. Patented Jan. 11, 1921.

Application filed January 12, 1920. Serial No. 351,043.

*To all whom it may concern:*

Be it known that I, WILLIAM J. HISS, a citizen of the United States, residing in the borough of Manhattan, city, county, and State of New York, have invented certain new and useful Improvements in Conduit or Cable Clamps and Bridle-Rings, of which the following is a specification taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a hook portion, a base, a portion of the base being provided with a transverse recess to coöperate with a bridle ring.

My invention further relates to a conduit or cable clamp which is preferably formed out of pressed sheet material as pressed steel, or which may be formed from castings of malleable iron, brass, an alloy, aluminum or any other metal, or may be made out of pressed fibrous material.

My invention further relates to crimping or bending the base of the conduit clamp to form a transverse recess to receive the shank of a bridle ring. My invention further relates to a bridle ring as a separate article of manufacture to be used with the conduit or cable clamp.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports;

Fig. 2 is a perspective view of the conduit or cable clamp and the bridle ring in the first position of assembling these two parts;

Fig. 3 is a perspective view similar to Fig. 2 but showing the bridle ring secured to the conduit or cable clamp;

Fig. 4 is a perspective view of the bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my cable or conduit clamp 1 with a hook portion 2 and a base 3. The base 3 is provided with a transverse recess 4 in any suitable manner. When the conduit or cable clamp is formed of sheet material this recess 4 is preferably formed by crimping or bending the base forming the hump 5. This crimp or hump serves also to strengthen the base 3.

Should the telephone or telegraph engineers, at the time the cable 6 is installed desire to supplement the service by adding one or more runs of bridle wires 7, 7 this can easily be done by inserting the horizontal shank 8 of the bridle ring 9 in the recess 4 as the conduit or cable clamp is being mounted.

Usually, however, these runs of bridle wires are not added to the installation to give additional service until weeks, months or years after the cable 6 has been mounted. In such cases of delayed installation of the bridle wires 7, 7 it is only necessary to loosen the screw 10 so that the shank 8 can be slipped under the end 11 of the conduit or cable clamp as shown in Fig. 2.

As soon as the shank is seated in the recess 4, the screw 10 is again screwed up to hold the conduit or cable clamp fast to the wall or other suitable support 12, which will also hold the bridle ring in position. The arm 13 on the bridle ring 9 prevents the shank 8 from rocking or rotating in one direction by engaging with the wall 12. The shank is prevented from rocking in the other direction by the arm 14 engaging with the wall. The other end of this arm is bent and curved to form the pig tail 15.

Should it be desirable at any future time to remove the bridle wires 7, 7 and the bridle ring it is only necessary to loosen the screw 10 sufficiently to permit the shank 8 to slip out of the recess 4 and under the end 11 of the clamp, when the screw 10 can be again tightened. It will be noted that in my improved construction no tapping or screw threading of the base 3 is required and that it is not necessary or desirable to place screw threads in the bridle ring 9, all of which saves expense of manufacture.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp formed of a single thickness of sheet metal having a hook portion to support a cable and a base to lie against a wall or other support, the inner surface of the base being provided with a transverse recess extending from side to side of said base and adapted to receive a horizontal shank of a bridle ring and a securing screw adapted to secure the conduit or cable clamp to a wall or other suitable support.

2. The combination of a conduit or cable clamp having a hook portion and a base provided with a transverse recess, and a bridle ring having a horizontal shank to fit into said recess and an arm to bear upon the wall or support to prevent rocking of the bridle ring in one direction.

3. The combination of a conduit or cable clamp having a hook portion and a base provided with a transverse recess, and a bridle ring having a horizontal shank to fit into said recess and two arms to bear upon the wall or support to prevent rocking of the bridle ring in either direction.

4. A new article of manufacture comprising a bridle ring having a horizontal shank, one end of the shank being bent at substantially right angles to the shank to form an arm to bear against a wall or other suitable support, the other end of the shank having a portion bent at right angles to the shank to form a second arm to bear against a wall or other support, this arm being extended and bent substantially in a vertical plane to form a hook to receive one or more bridle wires.

5. A conduit or cable clamp formed from one thickness of sheet metal and bent to form a hook portion to support a conduit or cable, and a base to be secured to a wall or other support, the base being further bent to form a transverse hump extending entirely across the base, to strengthen the base, the inner surface of the hump forming a transverse recess extending entirely across the inner surface of the base and adapted to form a bearing for a horizontal shank of a bridle ring.

WILLIAM J. HISS.

Witnesses:
AMMIÉ E. CAMERON,
MILDRED WILTSEY.